US010651987B2

United States Patent
Luo et al.

(10) Patent No.: US 10,651,987 B2
(45) Date of Patent: May 12, 2020

(54) OPERATOR IDENTIFICATION FOR CO-EXISTENCE ON A SHARED COMMUNICATION MEDIUM

(71) Applicant: QUALCOMM Incorporated, San Diego, CA (US)

(72) Inventors: Tao Luo, San Diego, CA (US); Chirag Patel, San Diego, CA (US); Peter Gaal, San Diego, CA (US); Vinay Chande, San Diego, CA (US); Nachiappan Valliappan, San Diego, CA (US); Ahmed Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/251,093

(22) Filed: Aug. 30, 2016

(65) Prior Publication Data
US 2017/0063504 A1  Mar. 2, 2017

Related U.S. Application Data

(60) Provisional application No. 62/212,137, filed on Aug. 31, 2015.

(51) Int. Cl.
*H04L 5/00*   (2006.01)
*H04W 72/04*   (2009.01)
(Continued)

(52) U.S. Cl.
CPC ........... *H04L 5/0048* (2013.01); *H04W 16/14* (2013.01); *H04W 72/0466* (2013.01);
(Continued)

(58) Field of Classification Search
CPC .... H04L 5/0048; H04W 16/14; H04W 16/32; H04W 72/0466; H04W 72/12; H04W 84/042; H04W 88/08
See application file for complete search history.

(56) References Cited

U.S. PATENT DOCUMENTS

2003/0119481 A1* 6/2003 Haverinen ............ H04W 8/065
                                                 455/411
2006/0183502 A1* 8/2006 Jeong ...................... H04W 8/02
                                                 455/560
(Continued)

FOREIGN PATENT DOCUMENTS

WO        2016086120        6/2016

OTHER PUBLICATIONS

CATT: "Design of LAA DRS," 3GPP Draft; R1-153923, 3rd Generation Partnership Project (3GPP), Mobile Competence Centre ; 650, Route Des Lucioles ; F-06921 Sophia-Antipolis Cedex ; France vol. RAN WG1. no. Beijing. China; Aug. 24-Aug. 28, 2015 Aug. 23, 2015 (Aug. 23, 2015). XP051001353, Retrieved from the Internet: URL:http://www.3gpp.orgjftp/Meetings 3GPP_SYNC/ RAN1/Docs/ -—[retrieved on Aug. 23, 2015 ], 4 pages.
(Continued)

*Primary Examiner* — Khaled M Kassim
(74) *Attorney, Agent, or Firm* — Muncy, Geissler, Olds & Lowe, P.C.

(57) ABSTRACT

Techniques for operator identification on a shared communication medium are disclosed. An access point may determine an operator identifier for an operator associated with an access point and configure a set of resource elements to carry an operator identifier reference signal embedded with the operator identifier. The access point may then transmit the operator identifier reference signal using the configured set of resource elements. An access terminal may receive signaling from an access point on a set of resource elements and
(Continued)

monitor the signaling for an operator identifier reference signal. The access terminal may then determine an operator identifier for an operator associated with the access point based on the operator identifier reference signal.

10 Claims, 10 Drawing Sheets (51) Int. Cl.
*H04W 72/12* (2009.01)
*H04W 16/14* (2009.01)
*H04W 88/08* (2009.01)
*H04W 84/04* (2009.01)
*H04W 16/32* (2009.01)

(52) U.S. Cl.
CPC ............ *H04W 72/12* (2013.01); *H04W 16/32* (2013.01); *H04W 84/042* (2013.01); *H04W 88/08* (2013.01)

(56) References Cited

U.S. PATENT DOCUMENTS

| | | | | |
|---|---|---|---|---|
| 2013/0163508 A1* | 6/2013 | Yu | ......................... | H04W 16/14 370/315 |
| 2014/0073335 A1* | 3/2014 | Panchal | .................. | H04W 4/00 455/450 |
| 2015/0098349 A1* | 4/2015 | Wei | ....................... | H04W 16/14 370/252 |
| 2015/0264592 A1* | 9/2015 | Novlan | ............... | H04L 27/2601 370/252 |
| 2015/0271847 A1* | 9/2015 | Luo | .................... | H04W 74/002 370/329 |
| 2015/0327226 A1* | 11/2015 | Cheng | ............... | H04W 72/1289 370/329 |
| 2016/0249279 A1* | 8/2016 | Koorapaty | ............ | H04W 48/16 |
| 2016/0286579 A1* | 9/2016 | Park | ....................... | H04L 5/0048 |
| 2016/0301434 A1* | 10/2016 | Botchway | ................ | H04B 1/10 |
| 2016/0330678 A1* | 11/2016 | Yoon | ......................... | H04L 5/00 |
| 2016/0338053 A1* | 11/2016 | Park | .................. | H04W 74/0808 |
| 2017/0237463 A1* | 8/2017 | Zheng | .................. | H04B 1/7087 370/328 |
| 2017/0280468 A1* | 9/2017 | Harada | ............... | H04W 72/085 |
| 2017/0289818 A1* | 10/2017 | Ng | ......................... | H04W 16/14 |
| 2017/0302496 A1* | 10/2017 | Xu | ....................... | H04L 27/2692 |
| 2017/0339704 A1* | 11/2017 | Matsumoto | ......... | H04W 72/082 |
| 2018/0041977 A1* | 2/2018 | Patel | ................. | H04W 72/0446 |

OTHER PUBLICATIONS

International Search Report and Written Opinion—PCT/US2016/049783—ISA/EPO—dated Nov. 7, 2016.
Mediatek Inc: "DRS Enhancements for RRM/CSI Measurements in LAA", 3GPP Draft, R1-151941 RRM Measurements_R1, 3rd Generation Partnership Project (3GPP), Mobile Competence Centre, 650, Route Des Lucioles, F-06921 Sophia-Antipolis Cedex, France, vol. RAN WG1, no. Belgrade, Serbia, Apr. 20-Apr. 24, 2015 Apr. 19, 2015 (Apr. 19, 2015), pp. 1-5, XP050934795, Retrieved from the Internet: URL: http://www.3gpp.org/ftp/Meetings_3GPP_SYNC/RAN1/Docs/, [retrieved on Apr. 19, 2015].
Panasonic: "DRS Design for LAA," 3GPP Draft; R1-154018, 3rd Generation Partnership Project (3GPP), Mobile Competence Centre ; 650, Route Des Lucioles ; F-06921 Sophia-Antipolis Cedex ; France vol. RAN WG1, no. Beijing, China; Aug. 24-Aug. 28, 2015 Aug. 23, 2015 (Aug. 23, 2015), XP051039385, Retrieved from the Internet: URL:http://www.3gpp.orgjftp/Meetings_3GPP_SYNC/RAN1/Docs/ -—[retrieved on Aug. 23, 2015], 8 pages.

* cited by examiner

OPERATOR IDENTIFICATION FOR CO-EXISTENCE ON A SHARED COMMUNICATION MEDIUM

CROSS-REFERENCE TO RELATED APPLICATIONS

The present application claims the benefit of U.S. Provisional Application No. 62/212,137, entitled "Operator Identification for Co-Existence on a Shared Communication Medium," filed Aug. 31, 2015, assigned to the assignee hereof and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may need to coexist with the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, determining an operator identifier for an operator associated with an access point; configuring a set of resource elements to carry an operator identifier reference signal embedded with the operator identifier; and transmitting, from the access point, the operator identifier reference signal using the configured set of resource elements.

In another example, a communication apparatus is disclosed. The apparatus may include, for example, at least one processor, at least one memory coupled to the at least one processor, and at least one transceiver. The at least one processor and the at least one memory may be configured to determine an operator identifier for an operator associated with an access point, and configure a set of resource elements to carry an operator identifier reference signal embedded with the operator identifier. The at least one transceiver may be configured to transmit, from the access point, the operator identifier reference signal using the configured set of resource elements.

In another example, another communication apparatus is disclosed. The apparatus may include, for example, means for determining an operator identifier for an operator associated with an access point; means for configuring a set of resource elements to carry an operator identifier reference signal embedded with the operator identifier; and means for transmitting, from the access point, the operator identifier reference signal using the configured set of resource elements.

In another example, a transitory or non-transitory computer-readable medium is disclosed. The computer-readable medium may include, for example, code for determining an operator identifier for an operator associated with an access point; code for configuring a set of resource elements to carry an operator identifier reference signal embedded with the operator identifier; and code for transmitting, from the access point, the operator identifier reference signal using the configured set of resource elements.

In another example, another communication method is disclosed. The method may include, for example, receiving signaling from an access point on a set of resource elements; monitoring the signaling for an operator identifier reference signal; and determining an operator identifier for an operator associated with the access point based on the operator identifier reference signal.

In another example, another communication apparatus is disclosed. The apparatus may include, for example, at least one transceiver, at least one processor, and at least one memory coupled to the at least one processor. The at least one transceiver may be configured to receive signaling from an access point on a set of resource elements. The at least one processor and the at least one memory may be configured to monitor the signaling for an operator identifier reference signal, and determine an operator identifier for an operator associated with the access point based on the operator identifier reference signal.

In another example, another communication apparatus is disclosed. The apparatus may include, for example, means for receiving signaling from an access point on a set of resource elements; means for monitoring the signaling for an operator identifier reference signal; and means for determining an operator identifier for an operator associated with the access point based on the operator identifier reference signal.

In another example, another transitory or non-transitory computer-readable medium is disclosed. The computer-readable medium may include, for example, code for receiving signaling from an access point on a set of resource elements; code for monitoring the signaling for an operator identifier reference signal; and code for determining an operator identifier for an operator associated with the access point based on the operator identifier reference signal.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to operation on a shared communication medium. To help facilitate network detection on the shared communication medium, an operator identifier such as a Public Land Mobile Network Identifier (PLMN ID) or the like may be transmitted over what is referred to herein as an Operator Identifier Reference Signal (ORS). The ORS may help access terminals or other neighboring devices distinguish access points based on operator deployment without having to fully decode other system information such as a System Information Block (SIB). The ORS may be spread across time and frequency in different ways to promote reliable detection. The ORS may also be positioned, scrambled, or a combination thereof, on an operator- or access point-specific basis.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
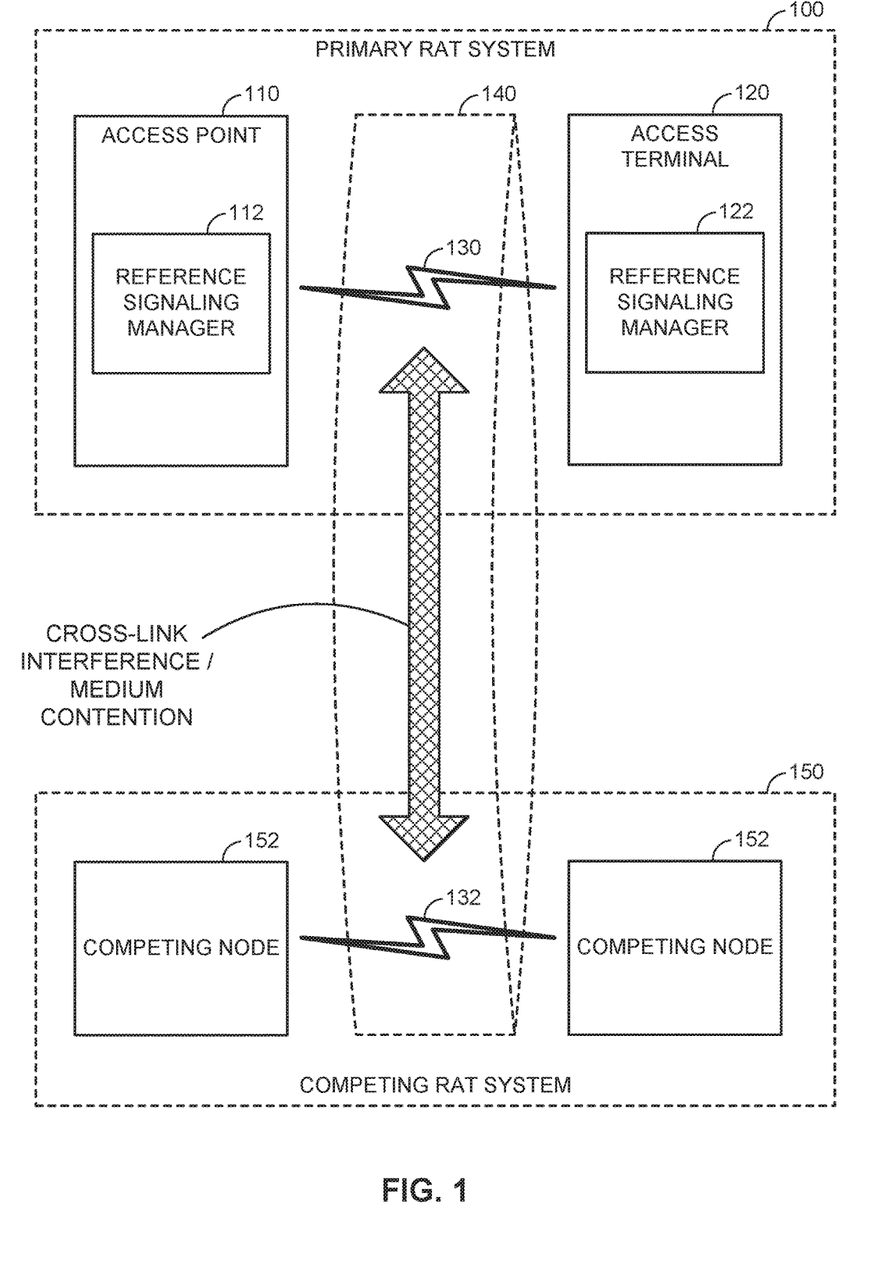
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the operator identification techniques discussed briefly above. For example, the access point 110 may include a reference signaling manager 112 and the access terminal 120 may include a reference signaling manager 122. The reference signaling manager 112 and/or the reference signaling manager 122 may be configured in different ways to manage identification of different operators on the communication medium 140.

Figure 2:
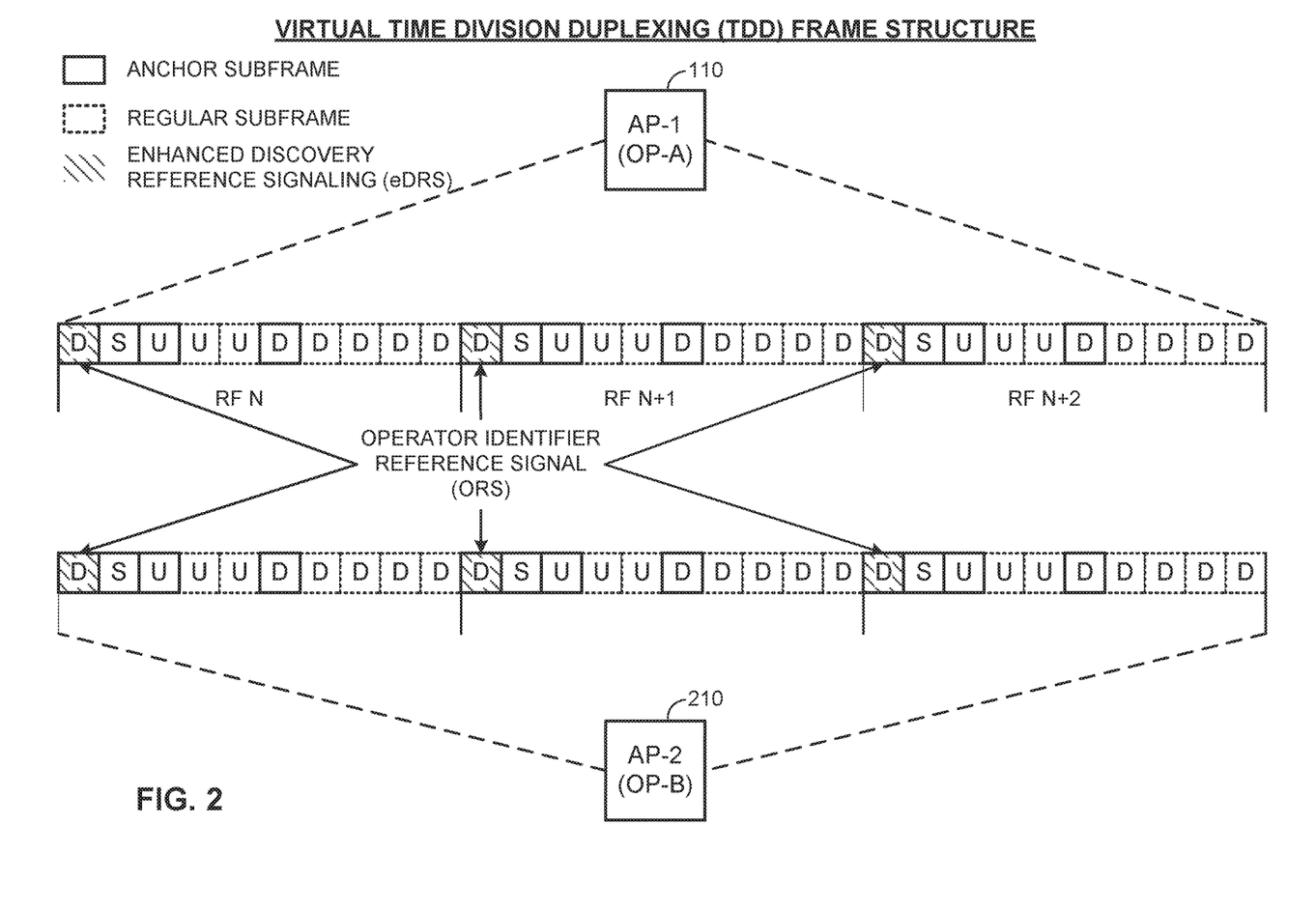
FIG. 2 illustrates an example virtual Time Division Duplexing (TDD) frame structure.

FIG. 2 illustrates an example virtual Time Division Duplexing (TDD) frame structure that may be implemented for the primary RAT system 100 on the communication medium 140 to facilitate contention-based access between the access point 110/access terminal 120 and the competing RAT system 150. For illustration purposes, the access point 110 (AP-1) is shown as part of a larger neighborhood that includes another access point 210 (AP-2) operating in accordance with a similar frame structure, although it will be appreciated that the two frame structures may differ in a variety of ways, including timing, configuration, fixed vs. variable subframe designations, and so on. The access point 110 and the access point 210 are provided by different operators, however, with the access point 110 corresponding to a first operator A (OP-A) and the access point 210 corresponding to a second operator B (OP-B).

The illustrated frame structure includes a series of radio frames (RFs) that are numbered in accordance with a system frame number numerology (RF N, N+1, N+2, etc.) and divided into respective subframes (SFs), which may also be numbered for reference (e.g., SF0, SF1, etc.). As an example, the LTE frame structure includes system frames that are divided into 1024 numbered radio frames composed of 10 subframes each, which together constitute an system frame cycle (e.g., lasting 10.24 s for 10 ms radio frames having 1 ms subframes). The use of a frame structure may provide more natural and efficient coordination among devices than more ad hoc signaling techniques.

The example frame structure of FIG. 2 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 2, a TDD configuration is employed that is similar to TDD Config 3 in LTE. The particular TDD configuration employed may be broadcast by the access point 110 using a System Information Block (SIB) message, a new physical channel to indicate the TDD frame format in the control region, or the like (e.g., a SIB-1 message in LTE).

Although each TDD configuration is different, there may be one or more subframes that are the same across all TDD configurations. These subframes are referred to herein as anchor subframes. Returning again to the LTE example above, the subframe SF0 is a downlink subframe, SF1 is a special subframe, SF2 is an uplink subframe, and SF5 is a downlink subframe in each radio frame across each of the TDD configurations TDD Config 0 through TDD Config 6. In the illustrated example, the anchor subframes similarly correspond to the subframes SF0, SF1, SF2, and SF5 of each radio frame, although it will be appreciated that the specific anchor carrier designations may vary across different systems.

The example frame structure of FIG. 2 is virtual in that each subframe may or may not be occupied by primary RAT signaling in any given instance due to the contention procedure for accessing the communication medium 140. In general, if the access point 110 or the access terminal 120 fails to win contention for a given subframe that subframe may be silenced.

As is further illustrated in FIG. 2, one or more subframes may be designated to include what is referred to herein as Enhanced Discovery Reference Signaling (eDRS). The eDRS may be configured to convey select control signaling for facilitating system operation. The control signaling may include information relevant to timing synchronization, system acquisition, interference measurements (e.g., Radio Resource Measurements (RRM)/Radio Link Measurements (RLM)), tracking loops, gain control (e.g., Automatic Gain Control (AGC)), paging, etc. The eDRS may be scheduled for transmission periodically (e.g., every 10 ms) in a designated subframe(s) of each radio frame. For example, the eDRS may be scheduled for transmission in accordance with a periodicity ($T_{DRS}$) at each subframe satisfying the condition SFN mod $T_{DRS}=0$ (illustrated by way of example as the first subframe SF0). In some deployments, the access point 110 may transmit the designated eDRS subframe automatically, without contending for access to the communication medium 140. In other deployments, however, the access point 110 may be required to contend for access to the communication medium 140 to transmit the designated eDRS subframe.

To help facilitate network detection, the eDRS may include, among other signaling, what is referred to herein as an Operator Identifier Reference Signal (ORS). The access point 110 and the access point 210, for example, may transmit different operator identifier values (e.g., explicitly or implicitly mapping or otherwise corresponding to a particular Public Land Mobile Network Identifier (PLMN ID) or the like) embedded into their respective ORS. The access terminal 120 may therefore be able to distinguish access points belonging to one operator such as the access point 110 from access points belong to another operator such as the access point 210. In this way, the access terminal 120 may be able to better avoid cells from other operators during initial acquisition, perform fast frequency scans during initial acquisition (e.g., move to another channel if the cell on the current channel is found to belong to another operator), avoid handover to cells of a different operator, and so on.

Figure 3:
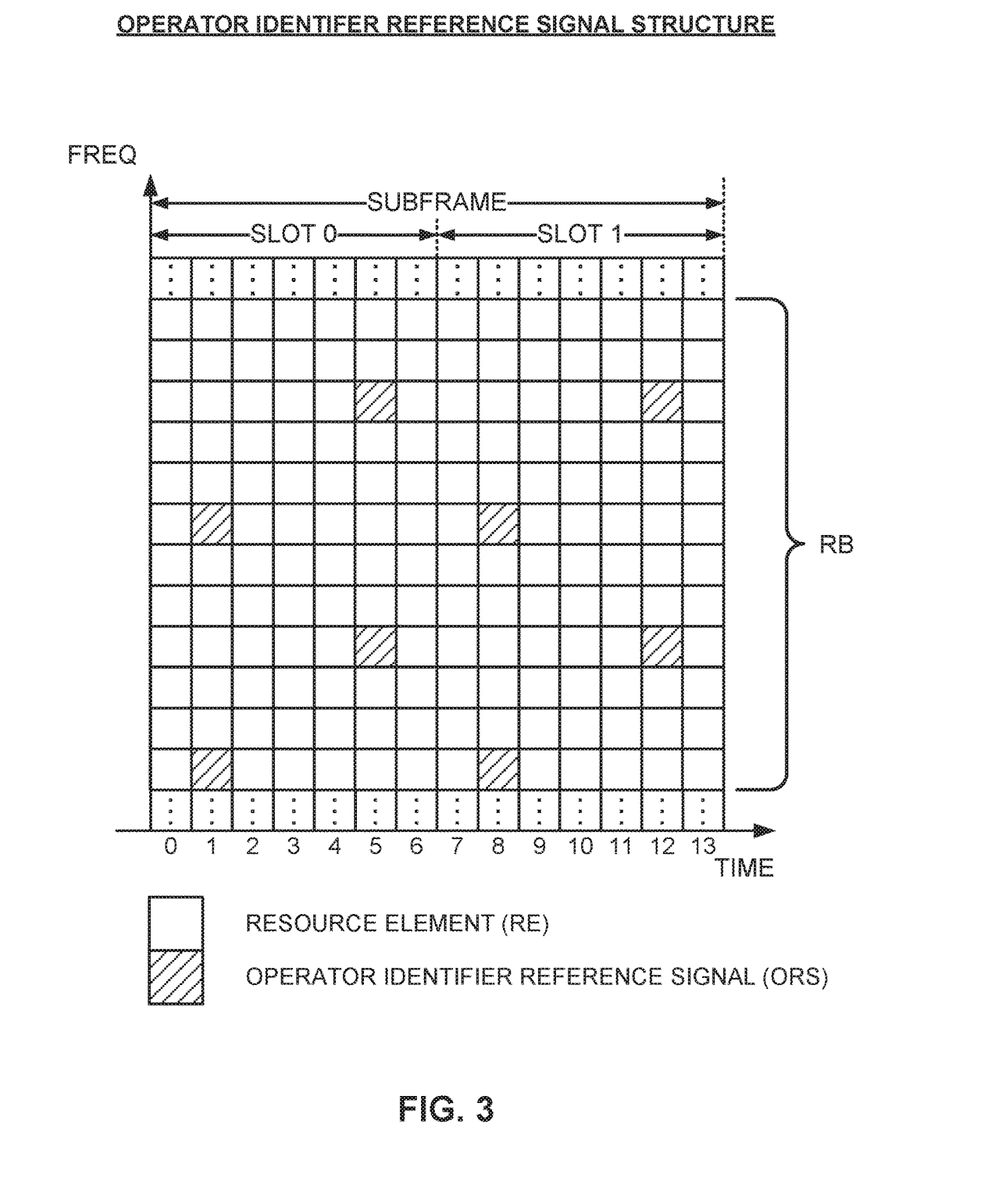
FIG. 3 is a resource map diagram illustrating an example Operator Identifier Reference Signal (ORS) configuration.

FIG. 3 is a resource map diagram illustrating an example ORS configuration of a given eDRS subframe. In this example, the ORS is embedded with a respective operator identifier (e.g., PLMN ID) of the associated access point, access point 110 or access point 210, and is spread across the eDRS subframe to provide time and frequency diversity for reliable detection. In the illustrated example, a set of 8 resource elements (REs) per resource block (RB) are allocated for ORS. It will be appreciated, however, that this is shown for illustration purposes only and that a different number of resource elements in a different configuration may be utilized for a given application as desired. The resource element density and configuration may be similar to that of a Cell-Specific Reference Signal (CRS), for example, with 8 resource elements being allocated in a configuration that substantially mirrors a 1-port CRS design, 16 resource elements being allocated in a configuration that substantially mirrors a 2-port CRS design, and so on. The ORS may also be transmitted from a single antenna port or multiple antenna ports.

The particular resource element locations employed may be different for the access points 110 and 210. As an example, the particular resource element locations employed may be selected as a function of the respective cell identities (e.g., Physical Cell Identifier (PCI)) of each of the access points 110 and 210. As another example, the particular resource element locations employed may be determined as a function of the respective cell identities as well as the respective operator identifiers (e.g., PLMN ID) of each of the access points 110 and 210. Thus, in some designs, the location of the set of resource elements may be used to embed the operator identifier, such that the access terminal 120 may quickly determine the operator identifier by monitoring a specific set of resource elements (e.g., those designated for a preferred operator) and looking for a correlation.

The set of resource elements used for transmitting the ORS may also be scrambled differently (e.g., in accordance with different scrambling sequences) for the access points 110 and 210. As an example, they may be scrambled as a function of the respective operator identifiers (e.g., PLMN ID) of each of the access points 110 and 210. As another example, they may be scrambled as a function of the respective operator identifiers as well as the respective cell identities (e.g., PCI) of each of the access points 110 and 210. Thus, in some designs, the scrambling may be used to embed the operator identifier, such that the access terminal 120 may quickly determine the operator identifier by descrambling the resource elements (e.g., using a respective scrambling sequence for a preferred operator) and looking for a correlation.

The access terminal 120 may accordingly and in different ways identify the access point 110 as corresponding to the first operator A (OP-A) and the access point 210 as corresponding to the second operator B (OP-B) based on the ORS. Based on this identification, the access terminal 120 may perform measurements in accordance with a provisioned priority associated with both the first operator A (OP-A) and the second operator B (OP-B). For example, when searching for a cell to acquire, the access terminal 120 may start with ORS measurements corresponding to the first operator A (OP-A) when it has a higher priority for system acquisition than the second operator B (OP-B).

Figure 4:
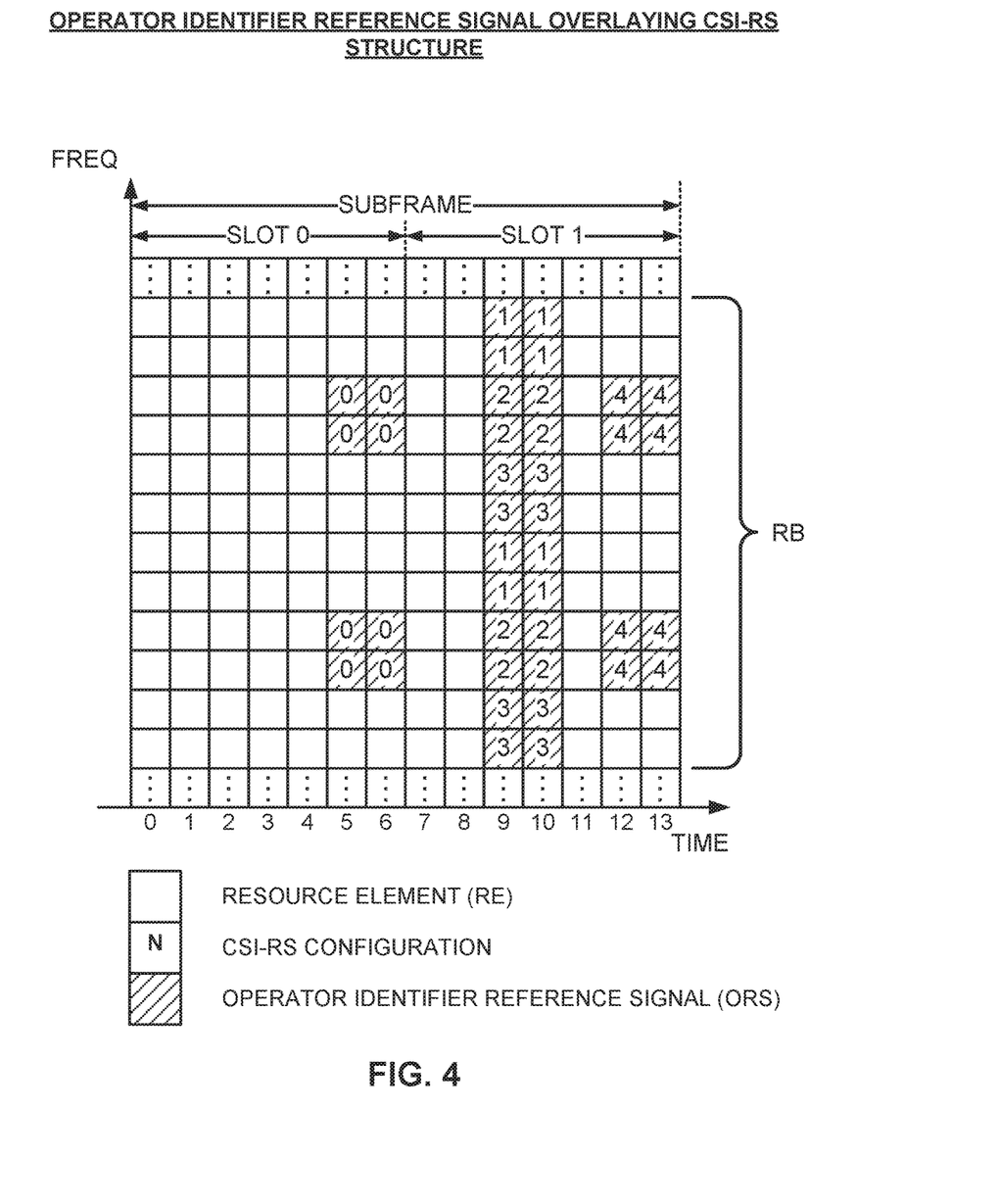
FIG. 4 is another resource map diagram illustrating another example ORS configuration.

FIG. 4 is another resource map diagram illustrating another example ORS configuration of a given eDRS subframe. This design is similar to that of FIG. 3 except that it is configured to co-opt one or more legacy channels for additional compatibility. In the illustrated example, the legacy channel being employed is a Channel State Information Reference Signal (CSI-RS). In this way, the access point 110, for example, may schedule a particular configuration of CSI-RS and use the designated resource elements for the ORS.

As shown, a multi-port CSI-RS may be configured to achieve a sufficient resource element allocation, with the access terminal 120 being configured to aggregate ORS information across the different configuration designations. For example, the access point 110 may replicate a 1-port CSI-RS transmission to occupy the equivalent of (legacy) 8 port CSI-RS transmissions (i.e., a new CSI-RS transmitted as a single port but using the resource elements of legacy 8-port CSI-RS). The access point 110 may also restrict CSI-RS to adjacent symbols (shown by way of example as symbols 9 and 10). For example, the access point 110 may limit the permitted CSI-RS configurations to match three 8-port configurations from legacy CSI-RS (Configs 1, 2, and 3 in the illustrated example). One of these configurations may be used for actual transmission of CSI-RS (e.g., the access point 110 may transmit CSI-RS using Config. 1 resources).

Accordingly, as will be appreciated from the description above, in general the ORS may not only correspond to a unique channel, but also to a repurposed legacy channel (e.g., CRS or CSI-RS) and, in some designs, modified legacy channel (e.g., enhanced CSI-RS). A high density transmission may be achieved by enhancing legacy channels.

For its part, the access terminal 120 may utilize the ORS in different ways, including for frequency scanning/initial acquisition, roaming, RRM, and so on.

Figure 5:
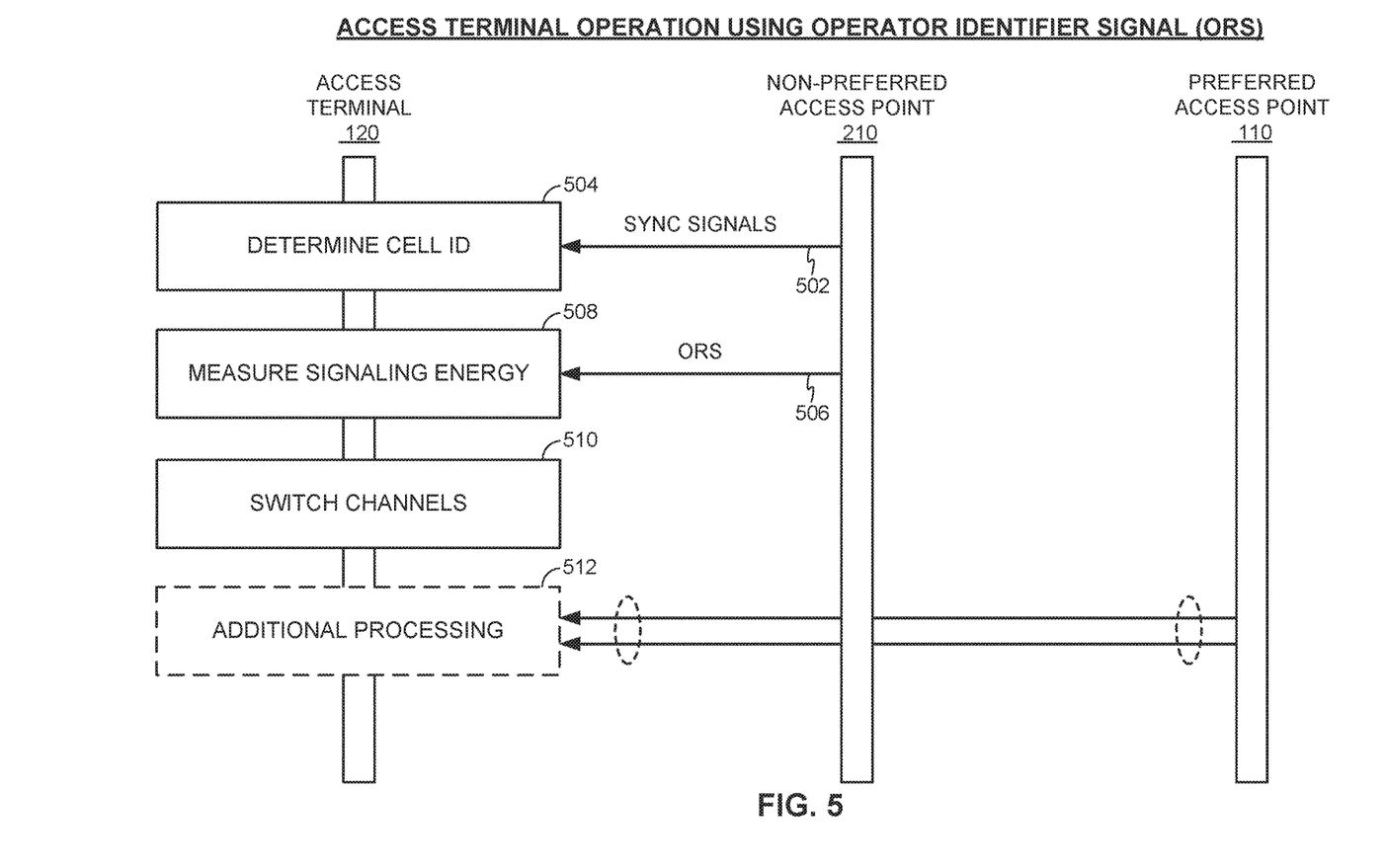
FIG. 5 is a signaling flow diagram illustrating example aspects of access terminal operation facilitated by the ORS signaling as provided herein.

FIG. 5 is a signaling flow diagram illustrating example aspects of access terminal operation facilitated by the ORS signaling as provided herein. In this example, the access terminal 120 is operating in the vicinity of an access point associated with a preferred operator, shown by way of example as the "preferred" access point 110 belonging to the first operator A (OP-A), and also in the vicinity of another access point associated with a different operator, shown by way of example as the "non-preferred" access point 210 belonging to the second operator B (OP-B). It will be appreciated that the illustrated signaling is a generalization shown only in relevant part, and that certain illustrated signaling may be omitted while other signaling may be added for a given implementation or scenario.

As shown, upon acquiring synchronization signals 502 (e.g., Primary Synchronization Signal (PSS)/Secondary Synchronization Signal (SSS)) and determining a cell identifier (e.g., PCI) for the access point 210 (block 504), the access terminal 120 may attempt to measure signaling energy of the ORS 506 on various resource elements based on the identifier of a preferred operator (e.g., based on the PCI and a desired PLMN-ID scrambling sequence for OP-A) (block 508). If there is a low correlation with the measured signaling energy, the access terminal 120 may move on to another channel (block 510), and, if desired, perform additional processing with respect to the preferred access point 110 (optional block 512). This enables fast frequency scanning, without requiring the access terminal 120 to determine the operator identifier explicitly (e.g., without requiring SIB decoding to get the PLMN ID).

That is, if the detected access point does not belong to the desired operator, the access terminal 120 need not spend time decoding further information and can quickly go to another channel. On the contrary, if the access point 120 does not find an access point with the desired operator identifier after scanning through all of the channels, it may synchronize with one of the channels from another operator (e.g., a roaming partner) and decode its corresponding operator identifier (e.g., via SIB). In either case, the access terminal 120 may perform various RRM measurements using the ORS.

Figure 6:
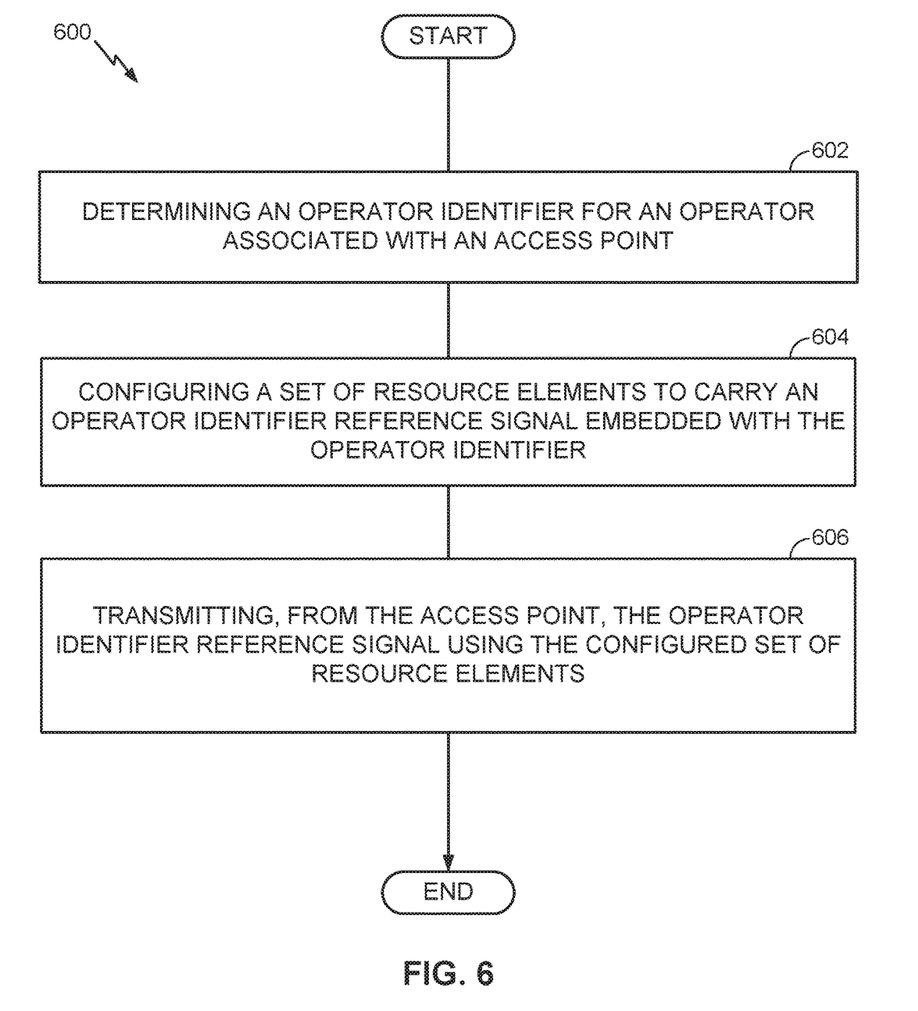
FIG. 6 is a flow diagram illustrating an example method of communication in accordance with the techniques described herein.

FIG. 6 is a flow diagram illustrating an example method of communication in accordance with the techniques described above. The method 600 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may determine an operator identifier for an operator associated with an access point (block 602) and configure a set of resource elements to carry an operator identifier reference signal embedded with the operator identifier (block 604). The access point may then transmit the operator identifier reference signal using the configured set of resource elements (block 606).

As discussed in more detail above, the operator identifier may correspond, for example, to a PLMN ID. The set of resource elements may form, for example, part of an eDRS subframe. The set of resource elements may also comprise at least eight resource elements in a corresponding resource block.

In some designs, the configuring (block 604) may comprise, for example, selecting the set of resource elements based on the operator identifier. The selecting may be further based on a cell identifier associated with the access point. In addition or as an alternative, the configuring (block 604) may comprise, for example, scrambling the set of resource elements based on the operator identifier. The scrambling may also be further based on a cell identifier associated with the access point. In addition or as another alternative, the configuring (block 604) may comprise, for example, scheduling the set of resource elements for another reference signal and repurposing the scheduled set of resource elements for the operator identifier reference signal. The other reference signal may correspond, for example, to a CSI-RS.

Figure 7:
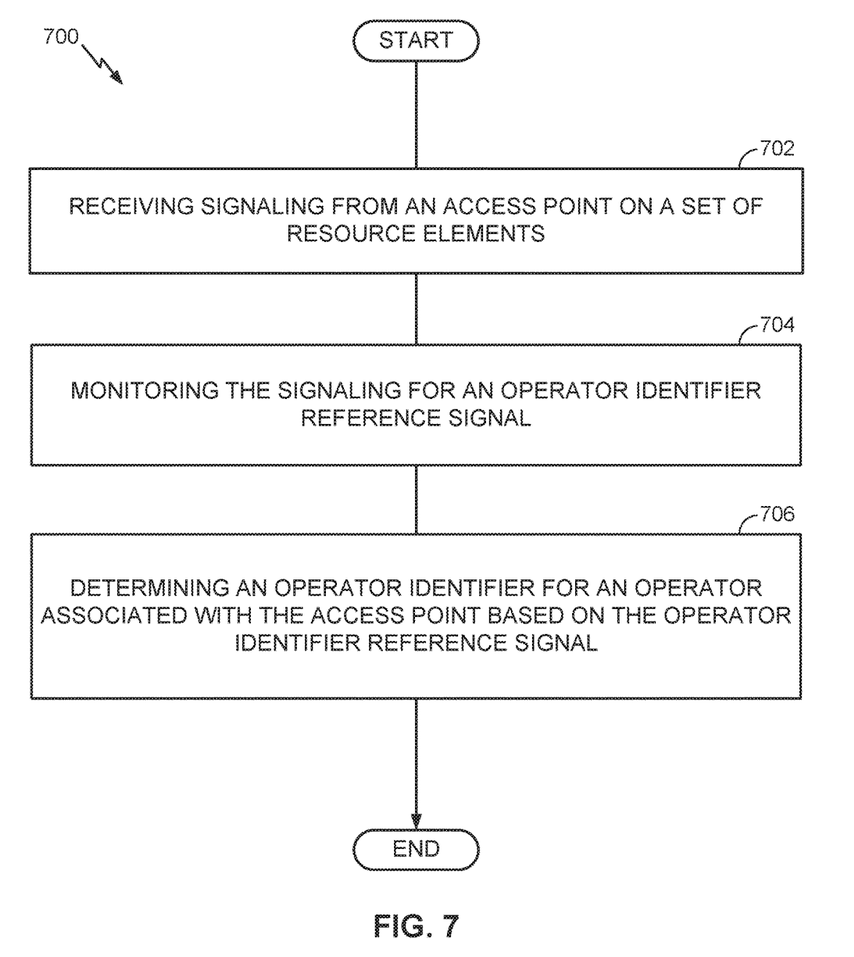
FIG. 7 is a flow diagram illustrating another example method of communication in accordance with the techniques described herein.

FIG. 7 is a flow diagram illustrating another example method of communication in accordance with the techniques described above. The method 700 may be performed, for example, by an access terminal (e.g., the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access terminal may receive signaling from an access point on a set of resource elements (block 702) and monitor the signaling for an operator identifier reference signal (block 704). Based on the operator identifier reference signal, the access terminal may determine an operator identifier for an operator associated with the access point (block 706).

As discussed in more detail above, the operator identifier may correspond, for example, to a PLMN ID. The set of resource elements may form, for example, part of an eDRS subframe. The set of resource elements may also comprise, for example, at least eight resource elements in a corresponding resource block.

In some designs, the monitoring (block 704) may comprise, for example, selecting the set of resource elements to monitor based on a preferred operator identifier. The selecting may be further based on a cell identifier associated with the access point. In addition or as an alternative, the monitoring (block 704) may comprise, for example, descrambling the signaling on the set of resource elements based on a preferred operator identifier. The descrambling may also be further based on a cell identifier associated with the access point. In addition or as another alternative, the monitoring (block 704) may comprise, for example, identifying the set of resource elements as being scheduled for another reference signal and monitoring the scheduled set of resource elements for the operator identifier reference signal. The other reference signal may correspond, for example, to a CSI-RS.

For generality, the access point 110 and the access terminal 120 are shown in FIG. 1 only in relevant part as including the reference signaling manager 112 and reference signaling manager 122, respectively. It will be appreciated, however, that the access point 110 and the access terminal 120 may be configured in various ways to provide or otherwise support the operator identification techniques discussed herein.

Figure 8:
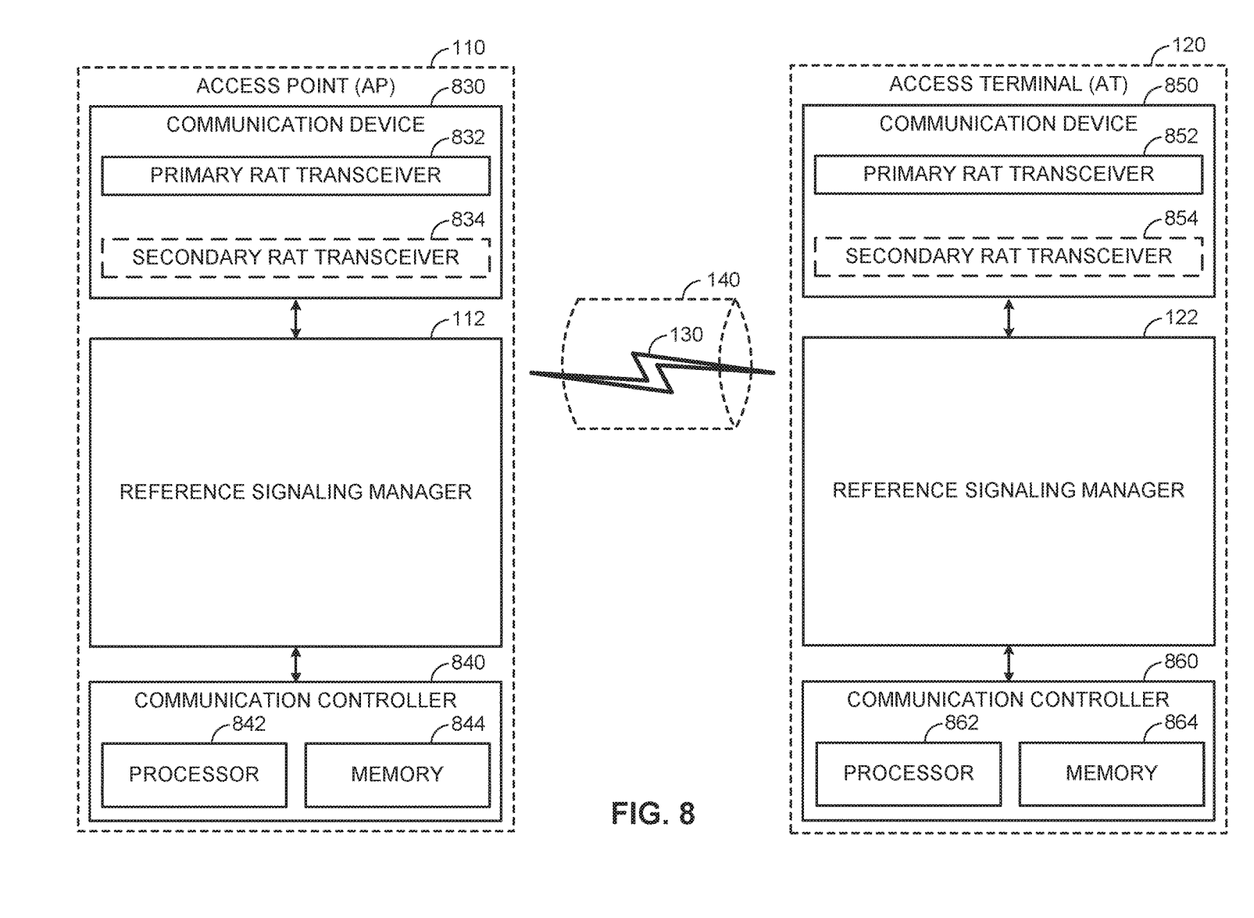
FIG. 8 is a device-level diagram illustrating example components of an access point and an access terminal in more detail.

FIG. 8 is a device-level diagram illustrating example components of the access point 110 and the access terminal 120 of the primary RAT system 100 in more detail. As shown, the access point 110 and the access terminal 120 may each generally include a wireless communication device (represented by the communication devices 830 and 850) for communicating with other wireless nodes via at least one designated RAT. The communication devices 830 and 850 may be variously configured for transmitting and encoding signals, and, conversely, for receiving and decoding signals in accordance with the designated RAT (e.g., messages, indications, information, pilots, and so on).

The communication devices 830 and 850 may include, for example, one or more transceivers, such as respective primary RAT transceivers 832 and 852, and, in some designs, (optional) co-located secondary RAT transceivers 834 and 854, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only).

Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 840 and 860) for controlling operation of their respective communication devices 830 and 850 (e.g., directing, modifying, enabling, disabling, etc.). The communication controllers 840 and 860 may include one or more processors 842 and 862, and one or more memories 844 and 864 coupled to the processors 842 and 862, respectively. The memories 844 and 864 may be configured to store data, instructions, or a combination thereof, either as on-board cache memory, as separate components, a combination, etc. The processors 842 and 862 and the memories 844 and 864 may be standalone communication components or may be part of the respective host system functionality of the access point 110 and the access terminal 120.

It will be appreciated that the reference signaling manager 112 and the reference signaling manager 122 may be implemented in different ways. In some designs, some or all of the functionality associated therewith may be implemented by or otherwise at the direction of at least one processor (e.g., one or more of the processors 842 and/or one or more of the processors 862), at least one memory (e.g., one or more of the memories 844 and/or one or more of the memories 864), at least one transceiver (e.g., one or more of the transceivers 832 and 834 and/or one or more of the transceivers 852 and 854), or a combination thereof. In other designs, some or all of the functionality associated therewith may be implemented as a series of interrelated functional modules.

Accordingly, it will be appreciated that the components in FIG. 8 may be used to perform operations described above with respect to FIGS. 1-7. For example, the access point 110 may determine, via the processor 842 and the memory 844, an operator identifier for an operator associated with the access point 110, and configure, via the processor 842 and the memory 844, a set of resource elements to carry an operator identifier reference signal embedded with the operator identifier. The access point 110 may then transmit, via the primary RAT transceiver 832, the operator identifier reference signal using the configured set of resource elements.

As another example, the access terminal 120 may receive, via the primary RAT transceiver 852, signaling from the access point 110 on a set of resource elements, and monitor, via the processor 862 and the memory 864, the signaling for an operator identifier reference signal. Based on the operator identifier reference signal, the access terminal may determine, via the processor 862 and the memory 864, an operator identifier for an operator associated with the access point 110.

Figure 9:
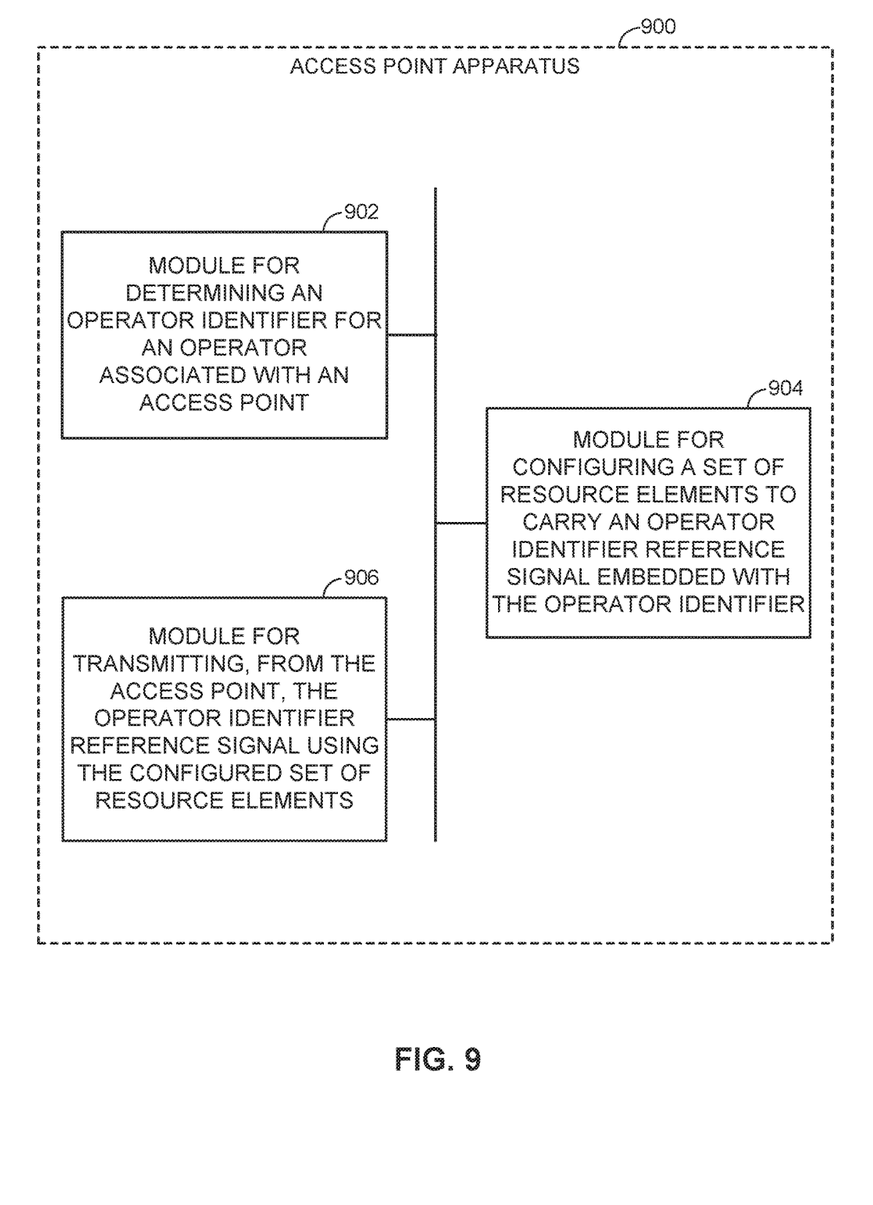
FIG. 9 illustrates an example apparatus represented as a series of interrelated functional modules.

FIG. 9 illustrates an example access point apparatus for implementing the reference signaling manager 112 represented as a series of interrelated functional modules. In the illustrated example, the apparatus 900 includes a module for determining 902, a module for configuring 904, and a module for transmitting 906.

The module for determining 902 may be configured to determine an operator identifier for an operator associated with an access point. The module for configuring 904 may be configured to configure a set of resource elements to carry an operator identifier reference signal embedded with the operator identifier. The module for transmitting may be configured to transmit the operator identifier reference signal using the configured set of resource elements.

As discussed in more detail above, the operator identifier may correspond, for example, to a PLMN ID. The set of resource elements may form, for example, part of an eDRS subframe. The set of resource elements may also comprise at least eight resource elements in a corresponding resource block.

In some designs, the module for configuring 904 may select the set of resource elements based on the operator identifier. The selecting may be further based on a cell identifier associated with the access point. In addition or as an alternative, the module for configuring 904 may scramble the set of resource elements based on the operator identifier. The scrambling may also be further based on a cell identifier associated with the access point. In addition or as another alternative, the module for configuring 904 may schedule the set of resource elements for another reference signal and repurpose the scheduled set of resource elements for the operator identifier reference signal. The other reference signal may correspond, for example, to a CSI-RS.

Figure 10:
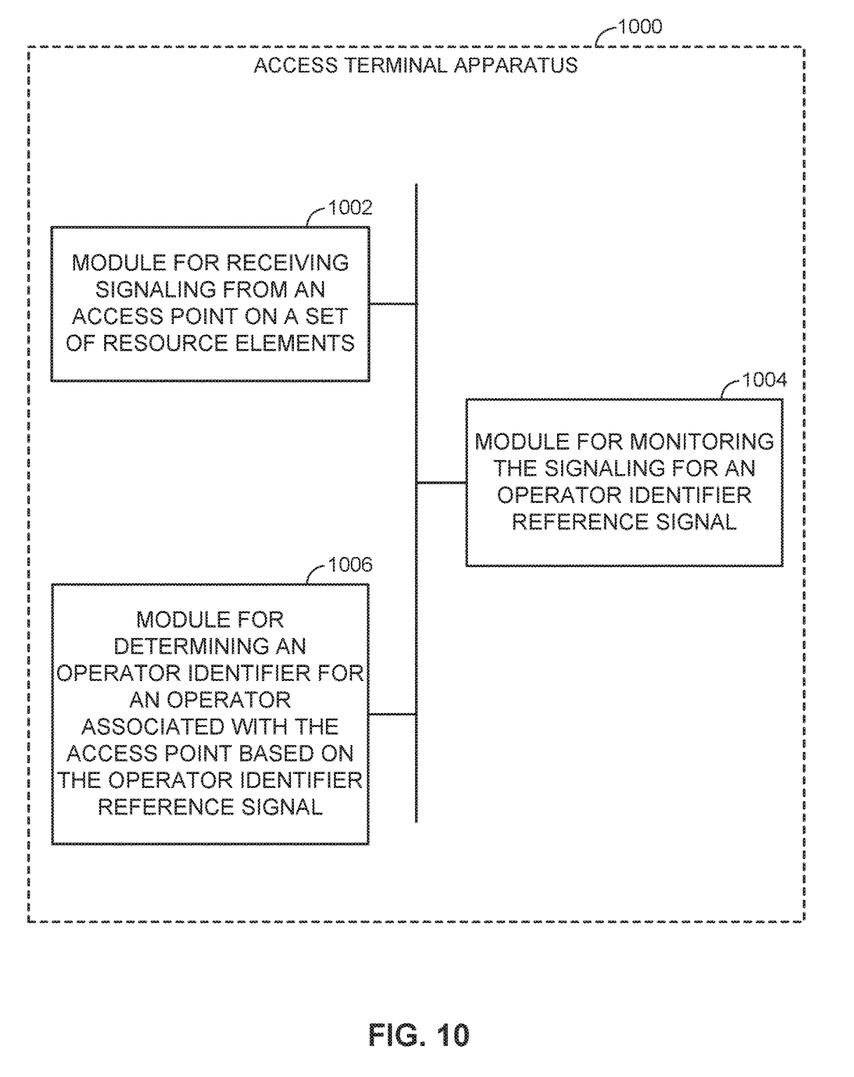
FIG. 10 illustrates an example apparatus represented as a series of interrelated functional modules.

FIG. 10 illustrates an example access terminal apparatus for implementing the reference signaling manager 122 represented as a series of interrelated functional modules. In the illustrated example, the apparatus 1000 includes a module for receiving 1002, a module for monitoring 1004, and a module for determining 1006.

The module for receiving 1002 may receive signaling from an access point on a set of resource elements. The module for monitoring 1004 may monitor the signaling for an operator identifier reference signal. Based on the operator identifier reference signal, the module for determining 1006 may determine an operator identifier for an operator associated with the access point.

As discussed in more detail above, the operator identifier may correspond, for example, to a PLMN ID. The set of resource elements may form, for example, part of an eDRS subframe. The set of resource elements may also comprise, for example, at least eight resource elements in a corresponding resource block.

In some designs, the module for monitoring 1004 may select the set of resource elements to monitor based on a preferred operator identifier. The selecting may be further based on a cell identifier associated with the access point. In addition or as an alternative, the module for monitoring 1004 may descramble the signaling on the set of resource elements based on a preferred operator identifier. The descrambling may also be further based on a cell identifier associated with the access point. In addition or as another alternative, the module for monitoring 1004 may identify the set of resource elements as being scheduled for another reference signal and monitor the scheduled set of resource elements for the operator identifier reference signal. The other reference signal may correspond, for example, to a CSI-RS.

The functionality of the modules of FIGS. 9-10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 9-10, as well as other components and functions described herein, may be implemented using any suitable means. Such means also may be implemented, at least in part, using corresponding structure as taught herein. For example, the components described above in conjunction with the "module for" components of FIGS. 9-10 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIG. 8 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
   receiving signaling from an access point;
   monitoring the signaling for an operator identifier reference signal, wherein the monitoring comprises:
   selecting a set of resource elements associated with a preferred operator; and
   measuring a signaling energy associated with the selected set of resource elements without decoding an operator identifier for an operator associated with the access point; and
   determining whether the operator is the preferred operator based on a degree of correlation between a preferred operator identifier and the measurement of the signaling energy,
   wherein the monitoring comprises descrambling the signaling on the set of resource elements based on the preferred operator identifier and a cell identifier associated with the access point.

2. The method of claim 1, wherein the operator identifier corresponds to a Public Land Mobile Network Identifier (PLMN ID).

3. The method of claim 1, wherein the set of resource elements forms part of an Enhanced Discovery Reference Signal (eDRS) subframe.

4. The method of claim 1, further comprising:
acquiring one or more synchronization signals from the access point; and
determining a cell identifier associated with the access point based on the acquired synchronization signals;
wherein the selecting of the set of resource elements is further based on the determined cell identifier.

5. The method of claim 1, wherein the monitoring comprises:
identifying the set of resource elements as being scheduled for another reference signal; and
monitoring the scheduled set of resource elements for the operator identifier reference signal.

6. The method of claim 5, wherein the other reference signal corresponds to a Channel State Information Reference Signal (CSI-RS).

7. The method of claim 1, wherein the set of resource elements comprises at least eight resource elements in a corresponding resource block.

8. A communication apparatus, comprising:
at least one transceiver configured to receive signaling from an access point;
at least one processor; and
at least one memory coupled to the at least one processor, the at least one processor and the at least one memory being configured to:
monitor the signaling for an operator identifier reference signal, wherein to monitor the signaling, the at least one processor and the at least one memory are further configured to select a set of resource elements associated with a preferred operator and measure a signaling energy associated with the selected set of resource elements without decoding an operator identifier for an operator associated with the access point, and
determine whether the operator identifier is the preferred operator based on a degree of correlation between a preferred operator identifier and the measurement of the signal energy,
wherein the at least one processor and the at least one memory are configured to descramble the signaling on the set of resource elements based on the preferred operator identifier and a cell identifier associated with the access point.

9. The apparatus of claim 8, wherein the operator identifier corresponds to a Public Land Mobile Network Identifier (PLMN ID).

10. The apparatus of claim 8, wherein the at least one processor and the at least one memory are configured to:
identify the set of resource elements as being scheduled for another reference signal; and
monitor the scheduled set of resource elements for the operator identifier reference signal.

* * * * *